US012422601B2

(12) United States Patent
Lin et al.

(10) Patent No.: US 12,422,601 B2
(45) Date of Patent: Sep. 23, 2025

(54) OPTICAL ELEMENT, IMAGE WAVEGUIDE METHOD, HEAD-MOUNTED DISPLAY APPARATUS AND DIFFRACTIVE WAVEGUIDE DISPLAY

(71) Applicants: Radiant Opto-Electronics (Suzhou) Co., Ltd., Jiangsu (CN); Radiant Opto-Electronics Corporation, Kaohsiung (TW)

(72) Inventors: Kuo-Feng Lin, Kaohsiung (TW); Hui-Wen Lu, Kaohsiung (TW); Wei-Chen Lin, Kaohsiung (TW); Hui-Ching Hsueh, Kaohsiung (TW)

(73) Assignees: Radiant Opto Electronics (Suzhou) Co., Ltd., Jiangsu (CN); Radiant Opto-Electronics Corporation, Kaohsiung (TW)

( * ) Notice: Subject to any disclaimer, the term of this patent is extended or adjusted under 35 U.S.C. 154(b) by 698 days.

(21) Appl. No.: 17/656,422

(22) Filed: Mar. 24, 2022

(65) Prior Publication Data
US 2022/0214487 A1 Jul. 7, 2022

Related U.S. Application Data

(63) Continuation of application No. PCT/CN2020/130821, filed on Nov. 23, 2020.

(51) Int. Cl.
*G02B 5/00* (2006.01)
*G02B 5/18* (2006.01)
(Continued)

(52) U.S. Cl.
CPC ......... *G02B 5/1809* (2013.01); *G02B 5/1814* (2013.01); *G02B 6/34* (2013.01);
(Continued)

(58) Field of Classification Search
CPC ...... G02B 5/1809; G02B 5/1814; G02B 6/34; G02B 27/0172; G02B 2027/0125;
(Continued)

(56) References Cited

U.S. PATENT DOCUMENTS

| 2011/0019250 A1* | 1/2011 | Aiki | G02B 5/32 |
| | | | 359/861 |
| 2017/0235142 A1* | 8/2017 | Wall | G02B 5/26 |
| | | | 359/633 |
| 2019/0056593 A1 | 2/2019 | Bablumyan | |

FOREIGN PATENT DOCUMENTS

| CN | 106773046 A | 5/2017 |
| CN | 108431640 A | 8/2018 |

(Continued)

*Primary Examiner* — Henry Duong
(74) *Attorney, Agent, or Firm* — CKC & Partners Co., LLC (57) ABSTRACT

An optical element includes a waveguide substrate, first and second optical film structures, and a sub-wavelength nanostructure. The waveguide substrate has first and second sides, a light entering surface and a light exiting surface. An image beam can enter the interior of the waveguide substrate through the light entering surface and travel in a manner of total internal reflection. The image beam exits the waveguide substrate via the light exiting surface after one or more reflections. The first and second optical film structures are respectively arranged on the first and second sides. The sub-wavelength nanostructure arranged on the first side can receive and diffract the image beam to couple the image beam to the waveguide substrate. The first and second optical film structures can reflect the part of the image beam at the incident angle smaller than the critical angle of the waveguide substrate.

15 Claims, 9 Drawing Sheets

(51) Int. Cl.
  *G02B 6/34*     (2006.01)
  *G02B 27/01*    (2006.01)
(52) U.S. Cl.
  CPC .. *G02B 27/0172* (2013.01); *G02B 2027/0125* (2013.01); *G02B 2207/101* (2013.01)
(58) Field of Classification Search
  CPC  G02B 2207/101; G02B 6/00; G02B 27/4272; G02B 27/0101; G02B 5/18; G02B 5/1828; G02B 5/1842; G02B 5/1847; G02B 5/188; G02B 2005/1804
  USPC ........................................................ 359/566
  See application file for complete search history.

(56)           References Cited

FOREIGN PATENT DOCUMENTS

CN      109154720  A    1/2019
CN      110352377  A   10/2019
CN      110462487  A   11/2019
TW      202026697  A    7/2020
WO     2018160506  A1   9/2018

\* cited by examiner

OPTICAL ELEMENT, IMAGE WAVEGUIDE METHOD, HEAD-MOUNTED DISPLAY APPARATUS AND DIFFRACTIVE WAVEGUIDE DISPLAY

CROSS-REFERENCE TO RELATED APPLICATION

This application is a continuation application of International application No. PCT/CN2020/130821, filed Nov. 23, 2020, which is incorporated herein by reference.

BACKGROUND

Technical Field

The present disclosure relates to a means of guiding an image beam by using a waveguide medium. More particularly, the present disclosure relates to an optical element, an image waveguide method, a head-mounted display apparatus and a diffractive waveguide display by using the above-mentioned means.

Description of Related Art

Virtual object manipulation technology mainly includes virtual reality (VR), augmented reality (AR), mixed reality (MR), etc. The VR is the technology of the interaction between a virtual object and a virtual environment. The AR is the technology of disposing a virtual object in a real environment. The MR is the technology of the interaction between a virtual object and a real environment. Current AR devices, such as head-mounted displays (HMDs) and head-up displays (HUDs), have been used in various applications, for example, entertainment, education, etc. However, the feature of the waveguide medium limits the field of view (FOV) of the current AR device to only about 40 degree angle, so that it can no longer meet the demand for user and cannot provide a user with good experience. In order to increase FOV, the AR device usually uses a glass lens with high refractive index as a waveguide medium to receive more light for providing larger images. However, the glass lens with the refractive index of 1.7 can only provide the FOV of about 40 degree angles. If a glass lens with a higher refractive index is required, its cost will increase correspondingly. Moreover, the refractive index of transparent glass has an upper limit and cannot increase without limit.

SUMMARY

An objective of the present invention is to provide a means of guiding an image beam by using a waveguide medium, which can increase the reflectance of the image beam in the waveguide medium to reduce the leakage of the image beam from the surface except light exiting surface, so the FOV can increase to 60 or more than 60 degree angle, thereby improving the experience of user.

According to the aforementioned object, an optical element is provided and suitable for guiding an image beam from an image source. The optical element includes a waveguide substrate, a first optical film structure, a second optical film structure and a sub-wavelength nanostructure. The waveguide substrate has a first side, a second side opposite to the first side, a light entering surface and a light exiting surface. The waveguide substrate is configured to allow the image beam to enter the interior thereof through the light entering surface, and configured to propagate the image beam between the first side and the second side of the waveguide substrate in a manner of total internal reflection, where the image beam exits the light exiting surface after one or more reflections. The first optical film structure and the second optical film structure are arranged on the first side and the second side of the waveguide substrate respectively. The sub-wavelength nanostructure is arranged on the first side of the waveguide substrate. The sub-wavelength nanostructure is configured to receive and diffract the image beam, so as to couple the image beam to the waveguide substrate. The first optical film structure and the second optical film structure are configured to reflect a part of the image beam at an incident angle inside the waveguide substrate smaller than a critical angle of the waveguide substrate.

According to an embodiment of the present invention, each of the first optical film structure and the second optical film structure includes at least one high refractive index layer and at least one low refractive index layer stacked alternately to each other.

According to another embodiment of the present invention, the material of the at least one high refractive index layer is tantalum oxide, titanium oxide or the combination thereof.

According to another embodiment of the present invention, the material of the at least one low refractive index layer is silicon oxide.

According to another embodiment of the present invention, the sub-wavelength nanostructure is arranged between the waveguide substrate and the first optical film structure.

According to another embodiment of the present invention, the sub-wavelength nanostructure is arranged on the first optical film structure.

According to another embodiment of the present invention, the sub-wavelength nanostructure and the first optical film structure are staggered in a direction along the thickness of the waveguide substrate.

According to another embodiment of the present invention, the first optical film structure covers the first side of the waveguide substrate completely, and the second optical film structure covers the second side of the waveguide substrate completely.

According to another embodiment of the present invention, the waveguide substrate includes a first waveguide layer and a second waveguide layer stacked alternately. The first waveguide layer and the second waveguide layer are adjacent to the first optical film structure and the second optical film structure respectively, where the refractive index of the first waveguide layer is higher than the refractive index of the second waveguide layer.

According to the aforementioned object, another optical element is provided and suitable for guiding an image beam from an image source. The optical element includes a plurality of light guide units. The light guide units are used for guiding a plurality of specific color beams in the image beam respectively, and the light guide units are stacked to each other. Each of the light guide units includes a waveguide substrate, a first optical film structure, a second optical film structure and a sub-wavelength nanostructure. The waveguide substrate has a first side, a second side opposite to the first side, a light entering surface and a light exiting surface. The waveguide substrate is configured to allow each of the specific color beams in the image beam to enter the interior thereof through the light entering surface, and configured to propagate each of the specific color beams between the first side and the second side of the corresponding waveguide substrate in a manner of total internal reflection, where each of the specific color beams exits the light exiting surface after one or more reflections. The first optical film structure and the second optical film structure are arranged on the first side and the second side of the waveguide substrate respectively. The sub-wavelength nanostructure is arranged on the first side of the waveguide substrate. In each of the light guide units, the sub-wavelength nanostructure is configured to receive and diffract the corresponding specific color beam, so as to couple the specific color beam to the waveguide substrate. The first optical film structure and the second optical film structure are configured to reflect a part of the specific color beam at an incident angle inside the waveguide substrate smaller than a critical angle of the waveguide substrate.

According to the aforementioned object, an image waveguide method is provided and includes the following steps. An image beam is collected. A plurality of specific color beams of the image beam is coupled to the optical element via diffraction. A sub-wavelength nanostructure of each of light guide units of the optical element receives and diffracts the corresponding specific color beam, so as to couple the specific color beam to the waveguide substrate. A first optical film structure and a second optical film structure of each light guide unit of the optical element reflect a part of the specific color beam at an incident angle inside the waveguide substrate smaller than a critical angle of the waveguide substrate.

According to the aforementioned object, a head-mounted display apparatus is provided and includes the abovementioned optical element.

According to the aforementioned object, a diffractive waveguide display is provided and includes the abovementioned optical element. The diffractive waveguide display further includes an image projection module, which is configured to project an image beam to the sub-wavelength nanostructure in the optical element.

According to another embodiment of the present invention, the image projection module is a laser projector.

According to another embodiment of the present invention, the laser projector includes a microelectromechanical mirror configured to couple each component beam of the image beam to the optical element at various incident angles.

BRIEF DESCRIPTION OF THE DRAWINGS

The disclosure can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation.

Terms used herein are only used to describe the specific embodiments, which are not used to limit the claims appended herewith. Unless limited otherwise, the term "a," "an," "one" or "the" of the single form may also represent the plural form. In addition, the spatially relative terms are intended to encompass different orientations of the device in use or operation in addition to the orientation depicted in the figures.

Reference numerals and/or letters may be repeated in the various examples. This repetition is for the purpose of simplicity and clarity and does not in itself dictate a relationship between the various embodiments and/or configurations discussed.

Figure 1:
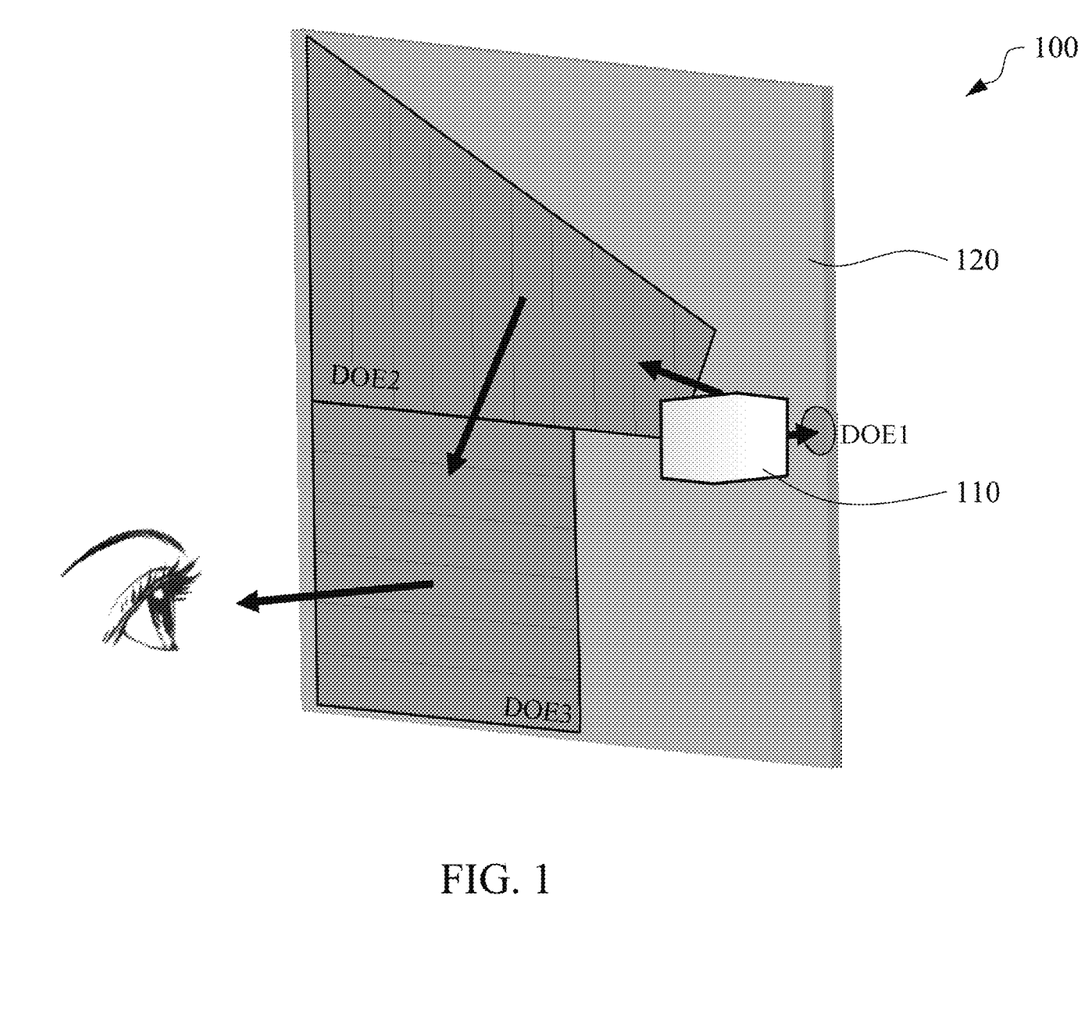
FIG. 1 is a schematic diagram of a diffractive waveguide display according to one embodiment of this disclosure.

FIG. 1 is a schematic diagram of a diffractive waveguide display 100 according to one embodiment of this disclosure. The diffractive waveguide display 100 can have the AR function and include an image projection module 110 and an optical element 120, in which the image projection module 110 is used for emitting an image beam, and the optical element 120 is suitable for guiding the image beam emitted by the image projection module 110. The image projection module 110 may be a laser projector, a liquid crystal on silicon (LCoS) projector, or a digital light processing (DLP) projector, for example, but not limited thereto. If the image projection module 110 is the laser projector, the image projection module 110 can include a microelectromechanical mirror which is configured to couple each component beam of the image beam to the optical element 120 at various incident angles. The optical element 120 is configured to couple the image beam in a specific area and to output the image beam in another area. The diffractive waveguide display 100 can be applied in many kinds of products, such as a head-mounted display, a head-up display (HUD) or other appropriate electronic product.

Figure 2:
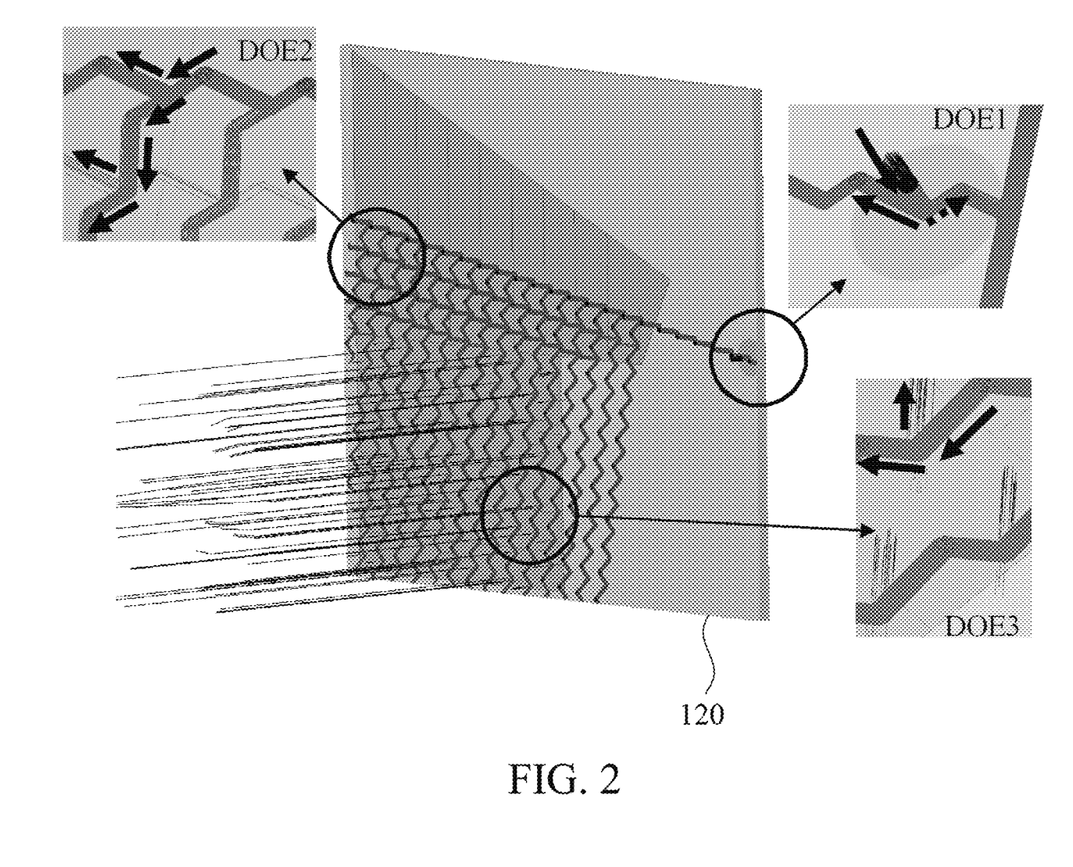
FIG. 2 is a schematic diagram of optical paths in the optical element of FIG. 1.

FIG. 2 is a schematic diagram of optical paths in the optical element 120 of FIG. 1. As shown in FIG. 2, the optical element 120 can supply three areas to three diffraction optical elements (DOEs) DOE1~DOE3. In the area corresponding to the diffraction optical element DOE1, the image beam from the image source is coupled to the inside of the optical element 120. The image beam keeps traveling inside the optical element 120 until it hits the area corresponding to the diffraction optical element DOE2. In the area corresponding to the diffraction optical element DOE2, the image beam coupled to the inside of the optical element 120 is separated into multiple beams laterally, and the traveling directions of the beams turn toward the area corresponding to the diffraction optical element DOE3. In the area corresponding to the diffraction optical element DOE3, the image beam coupled to the inside of the optical element 120 is separated laterally and coupled to the outside of the optical element 120. Accordingly, via the design of the diffraction optical elements DOE1~DOE3, the image projected from the small image projection module 110 can extend into a larger size under the light and thin structure, so that the user can watch the image in the screen easily.

Figure 3A:
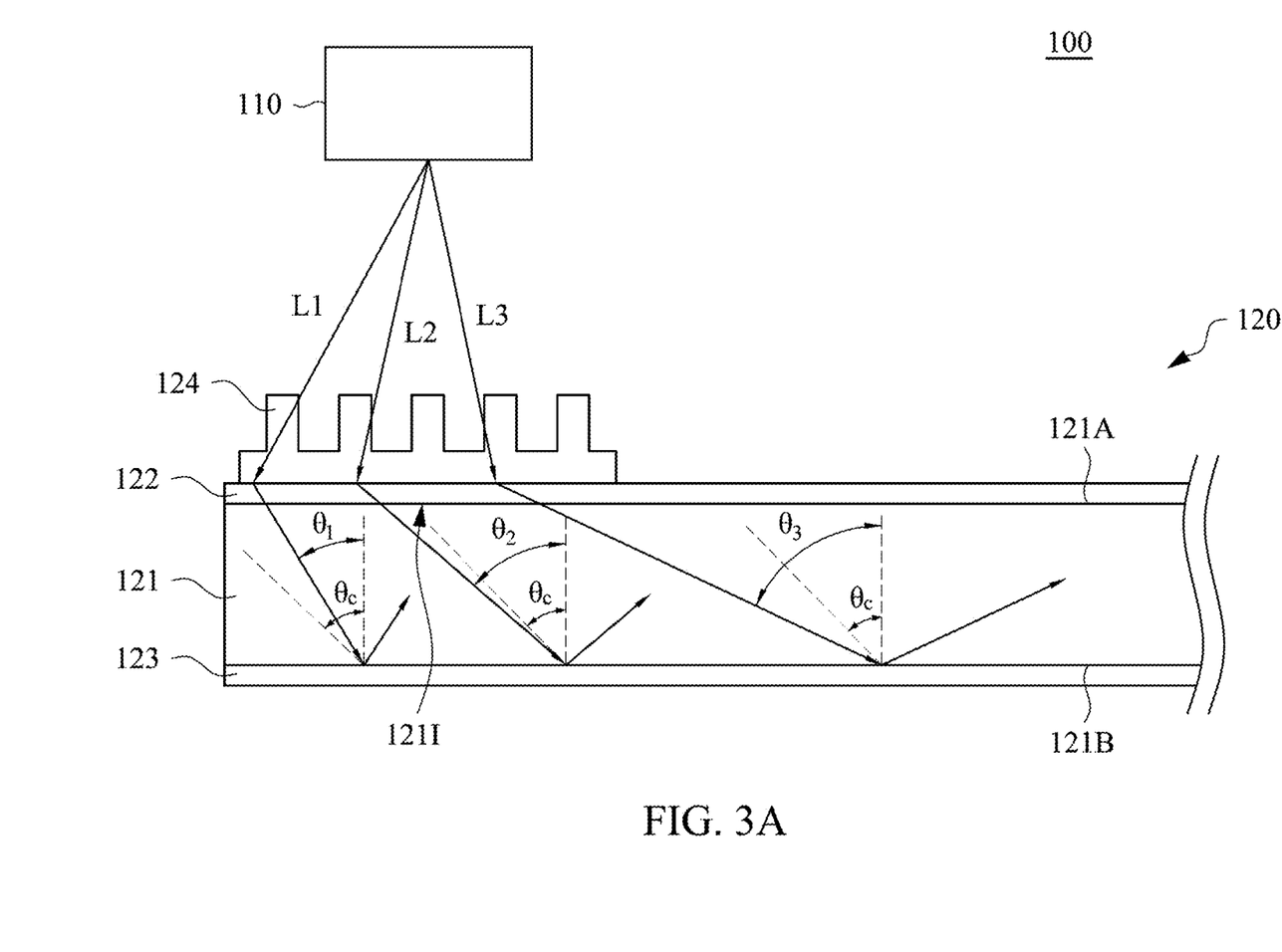
FIG. 3A is a schematic cross-sectional diagram of the partial structure of the optical element in FIG. 1.
Figure 3B:
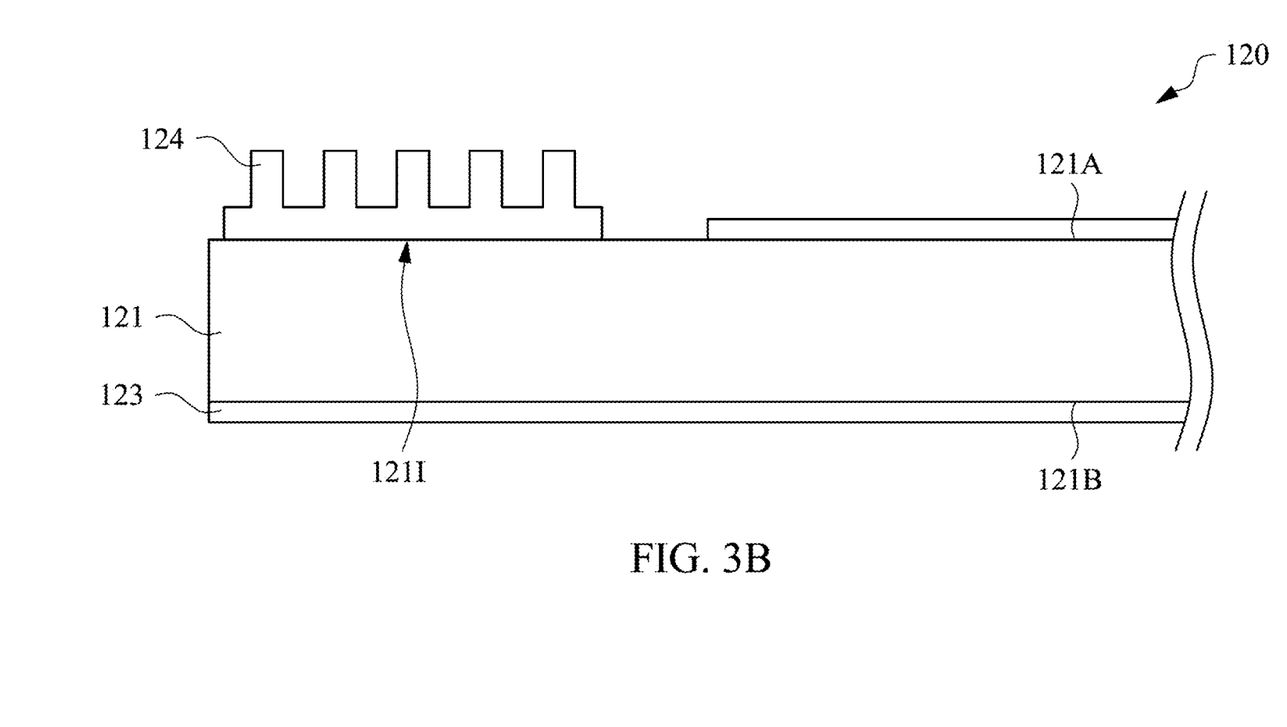
FIG. 3B is a schematic cross-sectional diagram of the partial structure of the optical element shown in FIG. 3A according to a various embodiment.

FIG. 3A is a schematic cross-sectional diagram of the partial structure of the optical element 120 in FIG. 1. As shown in FIG. 3A, the optical element 120 includes a waveguide substrate 121, an optical film structure 122, 123 and a sub-wavelength nanostructure 124. The waveguide substrate 121 has a first side 121A and a second side 121B opposite to the first side 121A, and has a light entering surface 1211 and a light exiting surface (not shown in FIG. 3A). The optical film structure 122 and the sub-wavelength nanostructure 124 are arranged on the first side 121A of the waveguide substrate 121, whereas the optical film structure 123 is arranged on the second side 121B of the waveguide substrate 121. In the present embodiment, the optical film structure 122 on the first side 121A also can be called "first optical film structure", whereas optical film structure 123 on the second side 121B also can be called "second optical film structure". In addition, the sub-wavelength nanostructure 124 is arranged on the optical film structure 122, that is, the waveguide substrate 121 and the sub-wavelength nanostructure 124 are located on two opposite sides of the optical film structure 122 respectively. In other embodiment, the sub-wavelength nanostructure 124 can be arranged between the waveguide substrate 121 and the optical film structure 122, and further covered by the optical film structure 122. Alternatively, the optical film structure 122 and the sub-wavelength nanostructure 124 can be arranged together on the first side 121A of the waveguide substrate 121, and the sub-wavelength nanostructure 124 are not covered by the optical film structure 122. As FIG. 3B shows a schematic cross-sectional diagram of the partial structure of the optical element shown in FIG. 3A according to a various embodiment, the optical film structure 122 and the sub-wavelength nanostructure 124 are staggered in a direction along the thickness of the waveguide substrate 121 (i.e., do no overlap each other), thereby blocking the light rays which are not expected to be diffracted by the sub-wavelength nanostructure 124, in which the light rays can be reflected by the optical film structure 122 to increase the overall coupling efficiency of the exit pupil expander (EPE) and to improve the uniformity of the output image.

Referring to FIG. 3A again, the waveguide substrate 121 is configured to allow the image beam projected by the image projection module 110 to enter the interior thereof through the light entering surface 1211 and configured to propagate the image beam between the first side 121A and the second side 121B of the waveguide substrate 121 in a manner of total internal reflection, where the image beam exits the light exiting surface (not shown in FIG. 3A) after one or more reflections. The waveguide substrate 121 can be composed of transparent optical material, such as glass, epoxy resin, polymethyl methacrylate (PMMA), polystyrene (PS), polycarbonate (PC), cyclic olefin polymer (COP), cyclic olefin copolymer (COC) or other appropriate material.

The optical film structure 122, 123 is used for increasing the reflectance of the image beam in the waveguide substrate 121 after entering the inside of the waveguide substrate 121. For example, as shown in FIG. 3A, the image beam L1 hits the second side 121B of the waveguide substrate 121 at an incident angle $\theta_1$ smaller than the critical angle $\theta_C$ of the waveguide substrate 121. Since the optical film structure 123 can increase optical reflectance for the light rays (including the image beam L1) at an angle smaller than the critical angle $\theta_C$, the reflection of the image beam L1 on the second side 121B of the waveguide substrate 121 can greatly increase. On the contrary, if the optical film structure 123 were non-existent, the image beam L1 would exit the second side 121B of the waveguide substrate 121 by refraction, thereby causing the leakage of the image beam L1. Accordingly, by arranging the optical film structure 123, the total internal reflection of the image beam L1 on the second side 121B of the waveguide substrate 121 can be caused to prevent the leakage of the image beam L1, which is equivalent to increasing an angle range for accommodating light rays, i.e., magnifying the accommodated virtual image. In addition, the image beams L2, L3 hit the second side 121B of the waveguide substrate 121 at the incident angles $\theta_2$, $\theta_3$ which are all greater than the critical angle $\theta_C$ of the waveguide substrate 121. According to the principle of total internal reflection (TIR), the total internal reflection of the image beams L2, L3 also can be caused on the second side 121B of the waveguide substrate 121.

Figure 4:
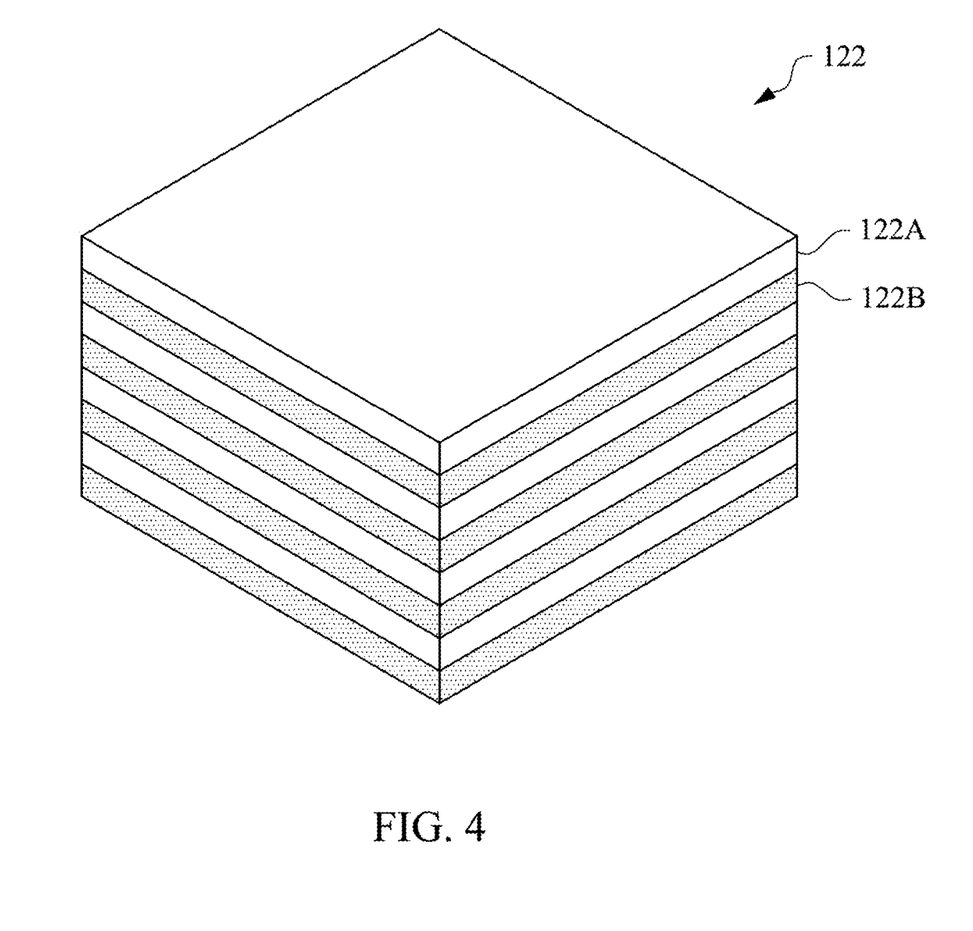
FIG. 4 is a schematic diagram of an example of the optical film structure in FIG. 3A.

FIG. 4 is a schematic diagram of an example of the optical film structure 122 in FIG. 3A. As shown in FIG. 4, the optical film structure 122 includes at least one high refractive index layer 122A and at least one low refractive index layer 122B stacked alternately to each other. The material of the high refractive index layer 122A may be titanium oxide ($TiO_2$), tantalum oxide ($Ta_2O_5$) or other appropriate material with significantly high refractive index, whereas the material of the low refractive index layer 122B may be silicon oxide ($SiO_2$) or other appropriate material with significantly low refractive index. The high refractive index layers 122A and the low refractive index layers 122B may have a thickness ranging about between 100 nm and 200 nm apiece. The numbers of the high refractive index layers 122A and the low refractive index layers 122B can be determined according to the design and the demand for application, and not limited to the depiction of FIG. 4. For example, if there are a greater refractive index difference between the high refractive index layer 122A and the low refractive index layer 122B, each of the high refractive index layers 122A and the low refractive index layer 122B will have less number, or the thickness of each of the high refractive index layer 122A and the low refractive index layer 122B will be thinner. By the interference of the beams reflected by the high refractive index layers 122A and the low refractive index layers 122B, the reflectance of the waveguide substrate 121 can increase to 70% or more than 70% efficiently. In other embodiment, the high refractive index layer 122A can be replaced by birefringent material, such as quartz crystal, calcite crystal, magnesium fluoride ($MgF_2$) crystal or other appropriate crystal with birefringence, or be replaced by a sub-wavelength grating structure, while the low refractive index layer 122A can be replaced by other isotropic material.

Like the optical film structure 122, the optical film structure 123 also can include at least one high refractive index layer and at least one low refractive index layers stacked alternately to each other. The stacked numbers, the arrangement and the materials of the high refractive index layer and the low refractive index layer in the optical film structure 123 can be the same as those of the optical film structure 122, so the corresponding description refers to the previous description of the optical film structure 122 and is not repeated herein.

The sub-wavelength nanostructure 124 is configured to receive and diffract the image beam and to couple the image beam to the waveguide substrate 121. Specifically, the sub-wavelength nanostructure 124 is the abovementioned optical element DOE1, which collects the image beams emitted by the image projection module 110 and couples a plurality of specific color beams in the image beam to the waveguide substrate 121 by diffraction. The sub-wavelength nanostructure 124 may be surface relief grating structure, holographic optical element structure, polarization volume grating structure or other structure having the function of optical diffraction. In some embodiments, as shown in FIG. 3A, the sub-wavelength nanostructure 124 is a surface relief grating structure having the periodic arrangement in a grating.

Figure 5A:
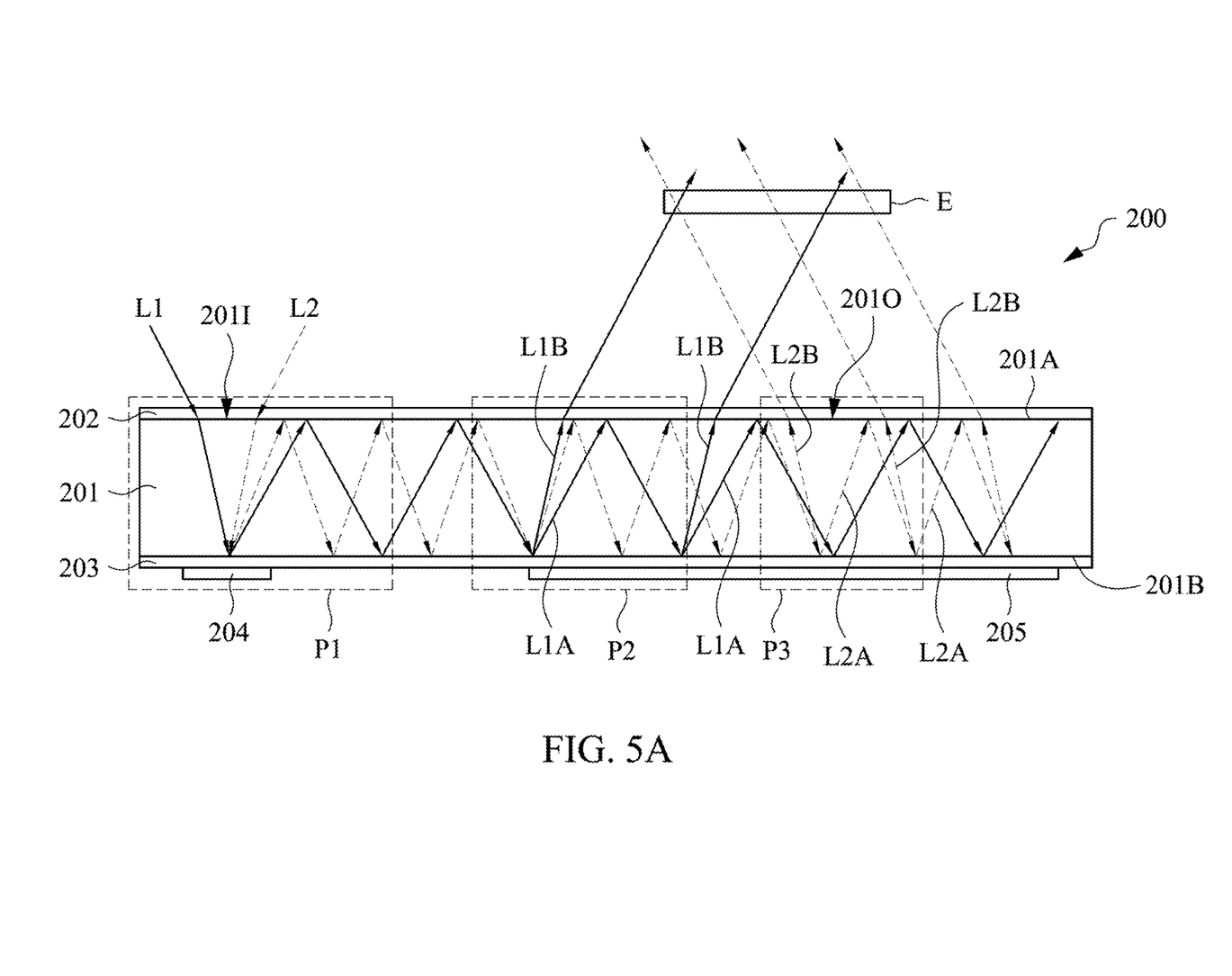
FIG. 5A is a schematic cross-sectional diagram of an optical element according to another embodiment.

FIG. 5A is a schematic cross-sectional diagram of an optical element 200 according to another embodiment. As shown in FIG. 5A, the optical element 200 includes a waveguide substrate 201, optical film structures 202, 203 and sub-wavelength nanostructures 204, 205, in which the optical film structure 202 is arranged on the first side 201A of the waveguide substrate 201, whereas the sub-wavelength nanostructures 204, 205 and the optical film structure 203 are all arranged on the second side 201B of the waveguide substrate 201. The waveguide substrate 201 and the optical film structures 202, 203 can be similar to the waveguide substrate 121 and the optical film structures 122, 123 in the optical element 120 of FIG. 3A respectively and thus not be repeated herein. According to the demand for application, the optical element 120 of the diffractive waveguide display 100 can be replaced by the optical element 200 shown in FIG. 5A.

Figure 5B:
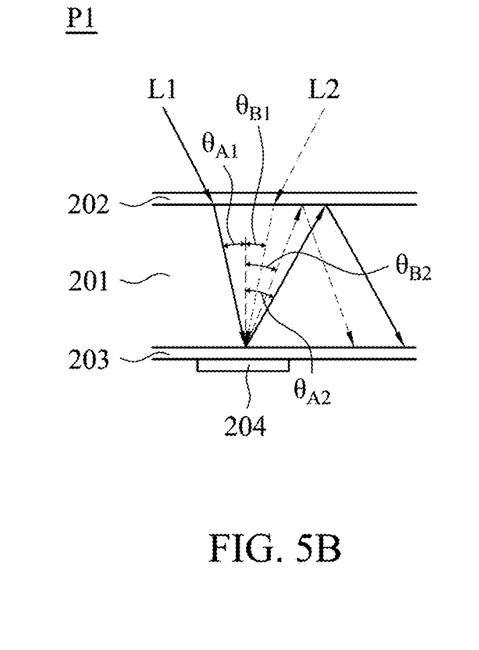
FIGS. 5B to 5D are partial views of areas in the schematic cross-sectional diagram of the optical element shown in FIG. 5A.

FIG. 5B is a partial view of an area P1 in the schematic cross-sectional diagram of the optical element 200 shown in FIG. 5A. As shown in FIGS. 5A and 5B, the image beams L1, L2 which enter the waveguide substrate 201 through the light entering surface 201A of the waveguide substrate 201 at various angles reflect at the reflective angles $\theta_{A2}$, $\theta_{B2}$ that all increase significantly after the diffractive effect of the sub-wavelength nanostructure 204. that is, the reflective angles $\theta_{A2}$, $\theta_{B2}$ are greater than incident angles $\theta_{A1}$, $\theta_{B1}$ respectively. Thus, the image beams L1, L2 can reflect off the first side 201A and the second side 201A of the waveguide substrate 201 at the reflective angle greater than the critical angle to achieve multiple total internal reflections. Alternatively, the reflection can greatly increase by the reflective effect of the optical film structures 202, 203. Then, by the diffractive effect of the sub-wavelength nanostructure 205, the image beams L1, L2 are separated into multiple component beams at various reflective angles.

Figure 5C:
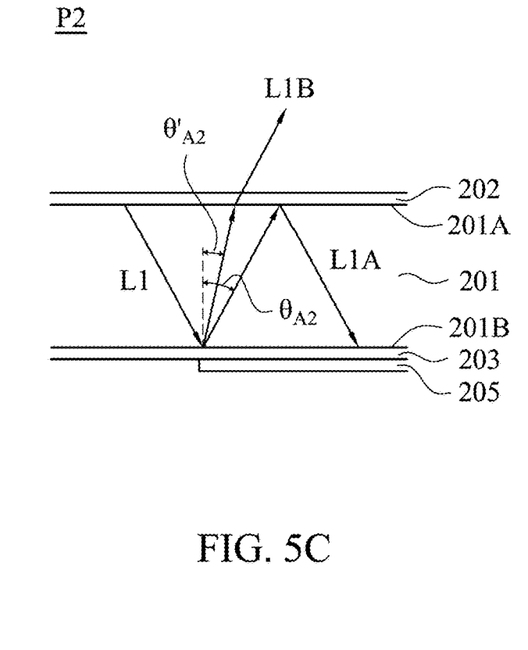

FIG. 5C is a partial view of an area P2 in the schematic cross-sectional diagram of the optical element 200 shown in FIG. 5A. As shown in FIGS. 5A and 5C, the image beam L1 is separated into a zero order beam L1A at a larger reflective angle $\theta_{A2}$ and a first order beam L1B at a smaller reflective angle $\theta'_{A2}$ by the diffractive effect of the sub-wavelength nanostructure 205. The zero order beam L1A can cause total internal reflection on the first side 201A of the waveguide substrate 201 and thus remain in the waveguide substrate 201, while the first order beam L1B hits an eyebox E through the light exiting surface 201O and the optical film structure 202 of the waveguide substrate 201.

Figure 5D:
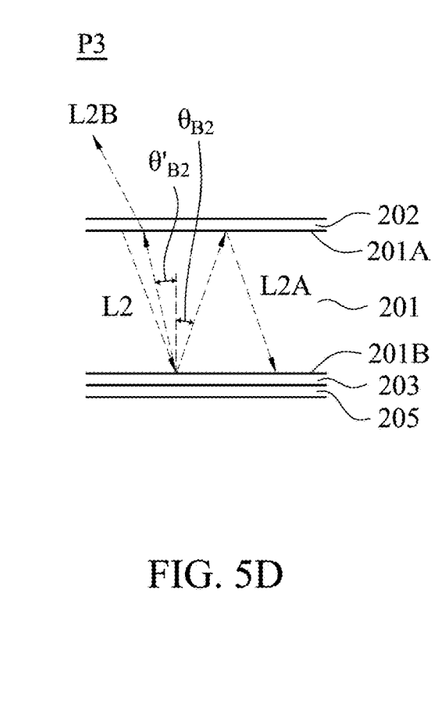

FIG. 5D is a partial view of an area P3 in the schematic cross-sectional diagram of the optical element 200 shown in FIG. 5A. Likewise, as shown in FIGS. 5A and 5D, the image beam L2 is separated into a zero order beam L2A at a larger reflective angle $\theta_{B2}$ and a first order beam L2B at a smaller reflective angle $\theta'_{B2}$ by the diffractive effect of the sub-wavelength nanostructure 205. The zero order beam L2A can cause total internal reflection on the first side 201A of the waveguide substrate 201 and thus remain in the waveguide substrate 201, while the first order beam L2B hits the eyebox E through the light exiting surface 201O and the optical film structure 202 of the waveguide substrate 201. The sub-wavelength nanostructures 204, 205 may be, for example, surface relief grating structure, holographic optical element structure, polarization volume grating structure or other structure having the function of optical diffraction.

Figure 6:
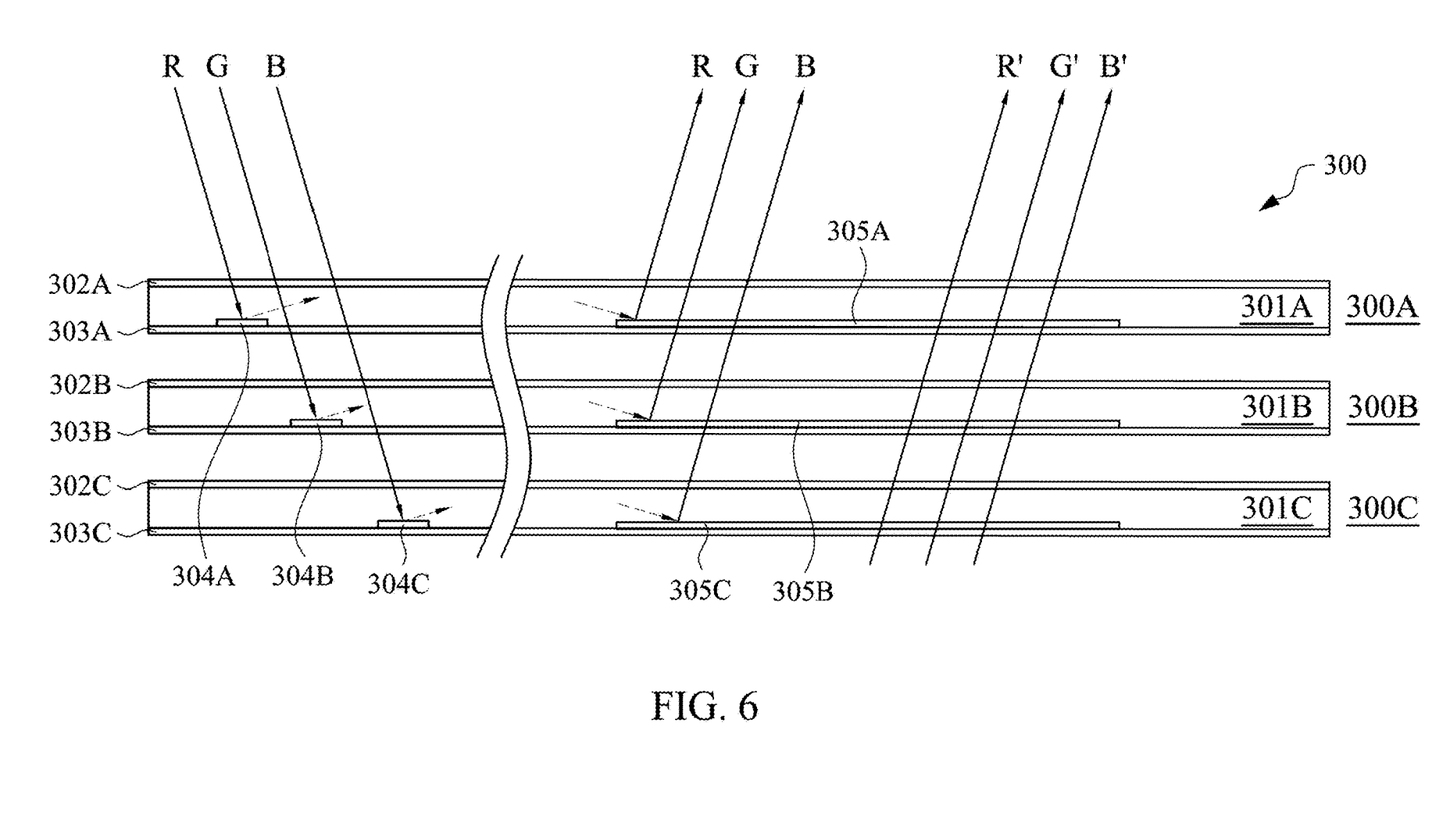
FIG. 6 is a schematic cross-sectional diagram of an optical element according to another embodiment of this disclosure.

FIG. 6 is a schematic cross-sectional diagram of an optical element 300 according to another embodiment of this disclosure. As shown in FIG. 6, the optical element 300 includes light guide units 300A, 300B, 300C disposed in sequence from down to up and stacked to each other. Each of the light guide units 300A, 300B, 300C has the same structure. The light guide unit 300A includes a waveguide substrate 301A, optical film structures 302A, 303A and sub-wavelength nanostructures 304A, 305A. The light guide unit 300B includes a waveguide substrate 301B, optical film structures 302B, 303B and sub-wavelength nanostructures 304B, 305B. The light guide unit 300C includes a waveguide substrate 301C, optical film structures 302C, 303C and sub-wavelength nanostructures 304A, 305C. In addition, the structure of each of the light guide units 300A-300C is similar to the structure of the optical element 200 shown FIG. 5. For example, the waveguide substrate 301A, the optical film structures 302A, 303A and the sub-wavelength nanostructures 304A, 305A of the light guide unit 300A are similar to the waveguide substrate 201, the optical film structures 202, 203 and the sub-wavelength nanostructures 204, 205 of the optical element 200 respectively. Likewise, according to the demand for application, the optical element 120 in the diffractive waveguide display 100 can be replaced by the optical element 300 shown FIG. 6.

In the optical element 300 shown in FIG. 6, the light guide units 300A, 300B, 300C are used for guiding the specific color beams R, G, B, and the sub-wavelength nanostructures 304A-304C, 305A-305C have the color selectivity apiece. Specifically, if the sub-wavelength nanostructures 304A-304C, 305A-305C are surface relief grating structures having the periodic arrangement in a grating apiece, the grating period of each surface relief grating structure can relate to the specific color beams R, G or B, so that the sub-wavelength nanostructures 304A, 305A have preferred diffractive efficiency on the specific color beam R, the sub-wavelength nanostructures 304B, 305B have preferred diffractive efficiency on the specific color beam G, and the sub-wavelength nanostructures 304C, 305C have preferred diffractive efficiency on specific color beam B. The reflective phenomena of the specific color light beams R, G, B in the waveguide substrates 301A-301C respectively are similar to the reflective phenomena of the image light beams L1 and L2 in the waveguide substrate 201 shown in FIG. 5, and the specific color light beams R, G, B exit the light exiting surfaces of the waveguide substrates 301A-301C after multiple total internal reflections. The specific color beams R, G, B can be red, green and blue beams respectively, or the combination of other color beams. For the specific color light beams R', G', B' from the front environment, due to the low incident angles thereof, the light guide units 300A, 300B, 300C have high transmittance to them.

Figure 7:
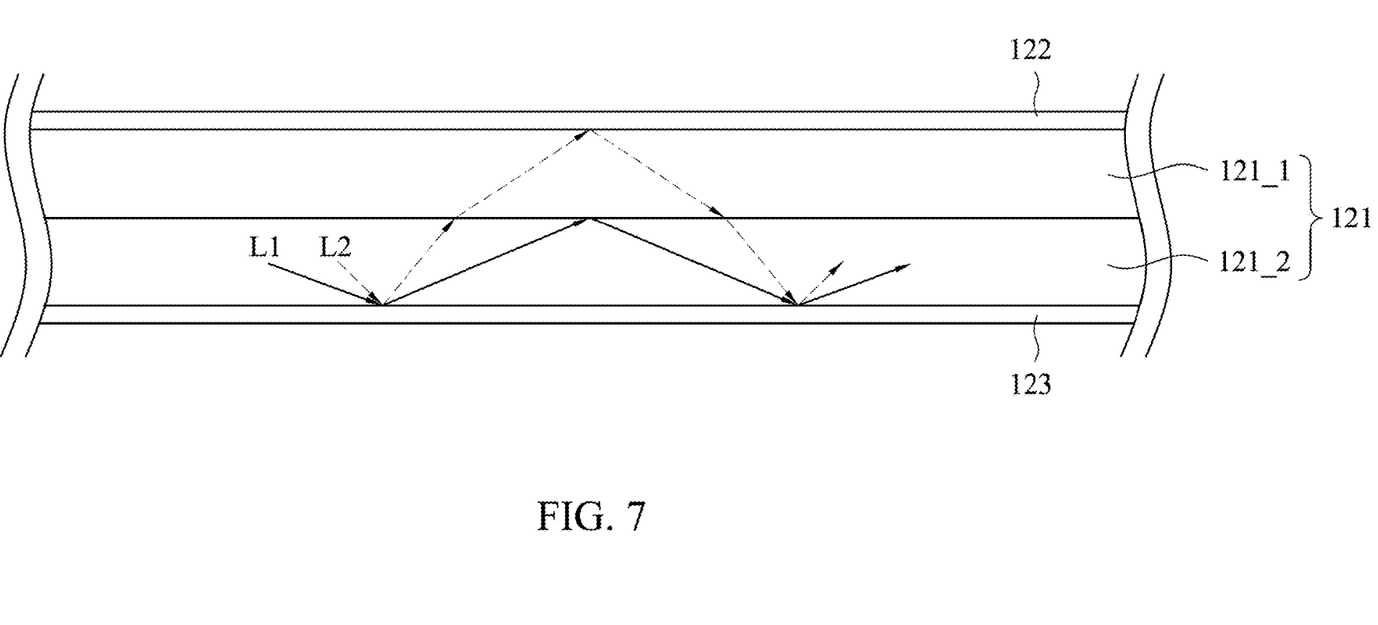
FIG. 7 is a schematic diagram of various embodiment of the optical element as shown in FIG. 1.

FIG. 7 is a schematic diagram of various embodiment of the optical element 120 as shown in FIG. 1. As shown in FIG. 7, the waveguide substrate 121 in the optical element 120 is composed of two waveguide layers 121_1, 121_2 stacked to each other, in which the waveguide layers 121_1, 121_2 are adjacent to the optical film structures 122, 123 respectively, and the refractive index of the lower waveguide layer 121_2 is greater than the refractive index of the upper waveguide layer 121_1, that is, the lower waveguide layer 121_2 is an optically dense medium, whereas the upper waveguide layer 121_1 is an optically rare medium. As a result, when a color beam travels in the waveguide substrate 121, is can easily enter the optically dense lower waveguide layer 121_2 from the optically rare upper waveguide layer 121_1. For the image beam L1 at a larger incident angle, since the incident angle of the image beam L1 is larger than the critical angle of the lower waveguide layer 121_2, according to the principle of total internal reflection (TIR), the total internal reflection of the image beam L1 can be caused on the boundary between the waveguide layers 121_1, 121_2, so that the image beam L1 only travels in the waveguide layer 121_2 and not enters the waveguide layer 121_1 from the waveguide layer 121_2. The image beam L2 at a smaller incident angle can be reflected by the optical film structure 123 of the lower optical film structure 121_2 and travel toward the upper waveguide layer 121_1. Thus, the image beam L2 can be refracted by the waveguide layer 121_2 to the waveguide layer 121_1. In this time, since the image beam L2 travels from the optically dense medium to the optically rare medium, based on Snell's law, the image beam L2 can exit the upper waveguide layer 121_1 at an increased refractive angle. If the refractive angle of the image beam L2 increases to over the critical angle of the upper waveguide layer 121_1, by using the total internal reflection of the upper waveguide layer 121_1, the image beam L2 can cause total internal reflection. If the refractive angle of the image beam L2 does not exceed the critical angle of the upper waveguide layer 121_1, the optical film structure 122 disposed on the surface of the upper waveguide layer 121_1 is used to make the image beam L2 reflect, and then enter the lower waveguide layer 121_2 of the optically dense medium again through the upper waveguide layer 121_1 of the optically rare medium, so as to keep transmitting the image beam L2 within the waveguide substrate 121 to the beyond. The double-layer substance design disclosed in the embodiment of FIG. 7 can more effectively prevent the light leakage of the image beams L1 and L2. With the design of more layers of substances, the mode shown in FIG. 4 will be formed, thereby reducing the amount of the light leakage.

Consequently, by the design of the optical film structure according to the embodiment of the disclosure, the reflectance of the part of the image beam in the waveguide substrate at the angle less than the critical angle can increase. This effect is equivalent to reducing the critical angle, so as to form a similar function of an angular filter. Hence, only few light rays of the image beam at small angle is not reflected by the optical film structure and thus leaks. Other most of the light rays can travel in the waveguide substrate by total internal reflection or reflect by the optical film structure to reduce the leakage of the mage beam from the surface except the light exiting surface, so that the FOV can increase to 60 or more than 60 degree angle, thereby improving the experience of user. On the other hand, the embodiment of the present disclosure does not need to employ a high-cost, high-refractive index glass lens as the waveguide medium, which can effectively reduce the cost to manufacture the optical element. In addition, the material with high refractive index can be used for the optical film structure, which is not limited by the refractive index upper limit of the waveguide substrate and also can contribute to the flexibility of the material selection of the optical element.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An optical element, suitable for guiding an image beam from an image source, the optical element comprising:
    a waveguide substrate, having a first side, a second side opposite to the first side, a light entering surface and a light exiting surface, the waveguide substrate configured to allow the image beam to enter the interior thereof through the light entering surface and configured to propagate the image beam between the first side and the second side of the waveguide substrate in a manner of total internal reflection, wherein the image beam exits the light exiting surface after one or more reflections;
    a first optical film structure, arranged on the first side of the waveguide substrate;
    a second optical film structure, arranged on the second side of the waveguide substrate; and
    a sub-wavelength nanostructure, arranged on the first side of the waveguide substrate,
    wherein the sub-wavelength nanostructure is configured to receive and diffract the image beam, so as to couple the image beam to the waveguide substrate,
    wherein the first optical film structure and the second optical film structure are configured to reflect a part of the image beam at an incident angle inside the waveguide substrate smaller than a critical angle of the waveguide substrate,
    wherein the waveguide substrate comprises a first waveguide layer and a second waveguide layer stacked alternately to each other, and a refractive index of the first waveguide layer is higher than a refractive index of the second waveguide layer.

2. The optical element of claim 1, wherein each of the first optical film structure and the second optical film structure comprises at least one high refractive index layer and at least one low refractive index layer stacked alternately to each other.

3. The optical element of claim 2, wherein a material of the at least one high refractive index layer is tantalum oxide, titanium oxide or a combination thereof.

4. The optical element of claim 2, wherein a material of the at least one low refractive index layer is silicon oxide.

5. The optical element of claim 1, wherein the sub-wavelength nanostructure is arranged between the waveguide substrate and the first optical film structure.

6. The optical element of claim 1, wherein the sub-wavelength nanostructure is arranged on the first optical film structure.

7. The optical element of claim 1, wherein the second optical film structure covers the second side of the waveguide substrate completely.

8. The optical element of claim 1, wherein the first side of the waveguide substrate is located on the first waveguide layer on which the sub-wavelength nanostructure and the first optical film structure are arranged, and the second side of the waveguide substrate is located on the second waveguide layer on which the second optical film structure is arranged.

9. A head-mounted display apparatus, comprising an optical element of claim 1.

10. A diffractive waveguide display, comprising:
    an optical element of claim 1; and an image projection module, configured to project an image beam to a sub-wavelength nanostructure of the optical element.

11. The diffractive waveguide display of claim 10, wherein the image projection module is a laser projector.

12. The diffractive waveguide display of claim 11, wherein the laser projector comprises:
a microelectromechanical mirror, configured to couple each component beam of the image beam to the optical element at various incident angles.

13. The optical element of claim 1, wherein the sub-wavelength nanostructure and the first optical film structure are staggered in a direction along a thickness of the waveguide substrate.

14. An optical element, suitable for guiding an image beam from an image source, the optical element comprising a plurality of light guide units used for guiding a plurality of specific color beams in the image beam respectively, the light guide units stacked to each other, and each of the light guide units comprising:
a waveguide substrate, having a first side, a second side opposite to the first side, a light entering surface and a light exiting surface, the waveguide substrate configured to allow each of the specific color beams of the image beam to enter the interior thereof through the light entering surface and configured to propagate each of the specific color beams between the first side and the second side of the waveguide substrate in a manner of total internal reflection, wherein each of the specific color beams exits the light exiting surface after one or more reflections;
a first optical film structure, arranged on the first side of the waveguide substrate;
a second optical film structure, arranged on the second side of the waveguide substrate; and
a sub-wavelength nanostructure, arranged on the first side of the waveguide substrate;
wherein in each of the light guide units, the sub-wavelength nanostructure is configured to receive and diffract the corresponding specific color beam, so as to couple the specific color beam to the waveguide substrate,
wherein the first optical film structure and the second optical film structure are configured to reflect a part of the specific color beam at an incident angle inside the waveguide substrate smaller than a critical angle of the waveguide substrate,
wherein the waveguide substrate comprises a first waveguide layer and a second waveguide layer stacked alternately to each other, and wherein a refractive index of the first waveguide layer is higher than a refractive index of the second waveguide layer.

15. An image waveguide method, comprising:
collecting an image beam;
coupling a plurality of specific color beams of the image beam to an optical element of claim 10 via diffraction;
receiving and diffracting the corresponding specific color beam by a sub-wavelength nanostructure of each of a plurality of light guide units of the optical element, so as to couple the specific color beam to the waveguide substrate; and
reflecting a part of the specific color beam at an incident angle inside the waveguide substrate smaller than a critical angle of the waveguide substrate by a first optical film structure and a second optical film structure of each of the light guide units of the optical element.

* * * * *